(12) United States Patent
Purdy et al.

(10) Patent No.: US 11,293,106 B2
(45) Date of Patent: Apr. 5, 2022

(54) ALKYLSULFONIC ACID COMPOSITIONS

(71) Applicant: Fluid Energy Group Ltd., Calgary (CA)

(72) Inventors: Clay Purdy, Medicine Hat (CA); Markus Weissenberger, Calgary (CA)

(73) Assignee: Fluid Energy Group Ltd., Calgary (CA)

( * ) Notice: Subject to any disclaimer, the term of this patent is extended or adjusted under 35 U.S.C. 154(b) by 0 days.

(21) Appl. No.: 16/722,170

(22) Filed: Dec. 20, 2019

(65) Prior Publication Data

US 2020/0224321 A1 Jul. 16, 2020

(30) Foreign Application Priority Data

Dec. 20, 2018 (CA) .................... CA 3028226

(51) Int. Cl.
| | |
|---|---|
| *C23F 11/16* | (2006.01) |
| *C09K 8/52* | (2006.01) |
| *C09K 8/60* | (2006.01) |
| *C09K 8/68* | (2006.01) |
| *C09K 8/74* | (2006.01) |
| *C09K 8/86* | (2006.01) |
| *C23F 11/04* | (2006.01) |
| *C23F 11/12* | (2006.01) |
| *C09K 8/54* | (2006.01) |

(52) U.S. Cl.
CPC ............ *C23F 11/163* (2013.01); *C09K 8/52* (2013.01); *C09K 8/54* (2013.01); *C09K 8/602* (2013.01); *C09K 8/68* (2013.01); *C09K 8/74* (2013.01); *C09K 8/86* (2013.01); *C23F 11/04* (2013.01); *C23F 11/122* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 7,216,710 B2 | 5/2007 | Welton et al. | |
| 2015/0126417 A1* | 5/2015 | Hatchman | C09K 8/584 507/219 |
| 2015/0329767 A1* | 11/2015 | Vaughn | C23F 11/04 166/305.1 |

* cited by examiner

*Primary Examiner* — Katie L. Hammer
(74) *Attorney, Agent, or Firm* — Berg Hill Greenleaf Ruscitti LLP

(57) ABSTRACT

Method of minimizing pitting corrosion at temperatures above 130° C., wherein said method comprises: providing an acidic fluid comprising an alkylsulfonic acid; providing at least one corrosion inhibitor compound comprising an organic compound comprising at least two aldehyde functional groups; combining said acidic fluid with said at least one corrosion inhibitor compound; exposing said mixed fluid to a metallic surface at a temperature of at least 130° C.; and allowing said mixed fluid sufficient time of exposure to a metal to accomplish a pre-determined function.

13 Claims, 5 Drawing Sheets

(4 of 5 Drawing Sheet(s) Filed in Color)

ALKYLSULFONIC ACID COMPOSITIONS

CROSS-REFERENCES TO RELATED APPLICATION

This application claims the benefit of and priority to Canadian Application No. 3,028,226, filed Dec. 20, 2018. The entire specification and figures of the above-referenced application is hereby incorporated in its entirety by reference.

FIELD OF THE INVENTION

This invention relates to novel alkylsulfonic acid compositions, more specifically alkylsulfonic acid compositions for use at high temperatures and providing reduced pitting corrosion.

BACKGROUND OF THE INVENTION

In the oil & gas industry, stimulation with an acid is performed on a well to increase or restore production. In many situations, various sizes of casing are placed in a well to prevent water table supply contamination, provide isolation between various formations to limit drilling fluid losses, contain high pressure formations, provide a means to secure down hole production equipment such as electric submersible pumps, pressure sensing equipment and isolation production strings etc. To secure these various lengths of casing cement is utilized which typically is of a very high density and resistant to degradation by produced well fluids as well as conventional acids, such as hydrochloric acid. After the well is drilled, a completion program is typically commenced which will stimulate the formations or zones of interest to stimulate oil and gas fluids to flow from the formation into the wellbore. During these stimulations fluids, gels, proppants, chemicals and gases such as nitrogen will be pumped into the formation via the casing perforations (or other completion technique).

One of the challenges facing the industry is breaking down, or cleaning the residual cement and debris left in the perforations or breaking through the actual cement sheath in certain completion techniques such as cemented sleeve ports. During a cemented sleeve port completion operation, coiled tubing tools (or a shifting ball) will be deployed capable of "sliding open" the sleeve which is placed and cemented in position during the casing placement stage of the wells drilling cycle (at the end of the drilling cycle). Once these sleeves are opened there is typically a cement sheath inhibiting flow from the casing to the formation. Acids are typically deployed prior to the frac fluid stage (this acid stage is called a "spearhead"). Most cement blends commonly utilized in the oil & gas industry have minimal acid solubility, hindering the effectiveness of most conventional acids.

Another major challenge operators face is executing remedial (cement) work on existing wells for either the purpose of sealing a leak in the cement portion of the well (causing a communication of well fluids to an undesirable section of the formation or well face), or for an abandonment of a well whose life cycle has expired. In both of these examples there is usually a need to seal any leaks that may be present by executing a "cement squeeze". Typically, an acid is pumped prior to the new cement to be placed to ensure an unobstructed pathway for the placement of the new cement to seal the leak or communication. In these situations, it is sometimes difficult to obtain an acceptable injection rate of the cement due to the inability of current acids typically used in the industry to solubilize the cement sufficiently.

Common day to day operations utilizing organic and mineral acids in the oil & gas industry include three major types of acid applications: matrix acidizing, fracture acidizing, and spearhead breakdown acidizing. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow.

There are many different mineral and organic acids used to perform an acid treatment on wells. The most common type of mineral acid employed on wells to stimulate production is hydrochloric acid (HCl), which is useful in stimulating carbonate reservoirs.

One of the major challenges faced in the oil & gas industry from using hydrochloric acid is the extremely high levels of corrosion (which is countered by the addition of 'filming' corrosion inhibitors that are typically themselves toxic and harmful to humans, the environment and equipment, and are very difficult to maintain in solution with the acid over a period of time); reactions between acids and various types of metals can vary greatly but certain metals, such as aluminum and magnesium, are very susceptible to major effects causing immediate damage. Also, hydrochloric acid produces hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes. The current invention involves an acid that is non-fuming, eliminating this risk for industry personnel.

The inherent environmental effects (organic sterility, poisoning of wildlife etc.) of hydrochloric acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically, if near the public, large areas need to be evacuated post event. Because of its acidic nature, hydrogen chloride gas is also corrosive, particularly in the presence of moisture.

The inability for conventional acids and blends of such to biodegrade naturally without neutralizing the soil results in expensive cleanup-reclamation costs for the operator should an unintended release occur. Moreover, the toxic fumes produced by mineral & many organic acids (acetic and formic in particular) are harmful to humans/animals and are highly corrosive and/or explosive potentially. Transportation and storage requirements for these acids are quite restrictive and taxing in such that you must typically haul the products in specialized acid tankers or intermediate bulk containers (IBC) that are rated to handle such corrosive products, bringing exposure dangers for personnel exposed to handling.

Another concern is the potential for spills on locations due to the high corrosion levels of conventional acids which can cause storage container failures and/or deployment equipment failures i.e. coiled tubing or fracturing iron failures caused from high corrosion rates (pitting, cracks, pinholes and major failures). Other concerns include: downhole equipment corrosion causing the operator to have to execute a work-over and replace down hole pumps, tubing, cables, packers etc.; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a blended product locally or very near its end use.

Another problem for industry utilizing conventional acids, and certain acid replacements is high temperature stability. Several operations in the oil industry expose fluids and equipment to very high temperatures (some upward of 200° C.). The compositions used in these various operations need to withstand these high temperatures without losing their effectiveness. These compositions must be capable of being used in operations over a wide range of temperatures while not affecting the equipment with which it comes in contact and yet still remain stable. The current invention has stability up over 180 degrees Celsius and will not lose its solubilizing characteristics as temperature increases as many mineral acids do. Having a high temperature, chemically stable, acid is very attractive to industry for multiple functions such as, but not limited to, acid fracturing, remedial operations, freeing stuck drilling pipe, spearhead acids, high temperature scale mitigation, and constant injection applications for SAGD (Steam Assisted Gravity Drainage) programs.

When used to treat scaling issues on surface due to water/fluid precipitation, acids are exposed to personnel and mechanical devices as well as expensive pumping equipment causing increased risk for the operator and corrosion effects that damage equipment and create hazardous fumes. Conventional acids typically need to be blended with fresh water (due to their intolerance of highly saline water, causing precipitation of minerals) to the desired concentration requiring companies to pre-blend off-site as opposed to blending on-site with produced water thereby increasing costs associated with transportation.

When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to equipment/wells. Having to deal with 'live' acid during the back-flush process is also very expensive as conventional acids typically are still at a very low pH and toxic. It is advantageous to have an acid blend that can be exported to production facilities through pipelines that once spent or applied, is commonly a neutral pH greatly reducing disposal costs/fees.

Acids perform many actions in the oil & gas industry and are considered necessary to achieve the desired production of various petroleum wells, maintain their respective systems and aid in certain functions (i.e. remedial well intervention, or abandonment of a well that has expired its life cycle). The associated dangers that come with using acids are expansive and tasking to mitigate through controls, whether they are chemically or mechanically engineered. Eliminating, or even simply reducing, the negative effects of acids while maintaining their usefulness is a struggle for the industry, especially at higher temperatures encountered downhole. As the public demand for the use of cleaner/safer/greener products increases, companies are looking for alternatives that perform the required function without all, or most of the, drawbacks associated with the use of conventional acids.

Methanesulfonic acid is a well-known acid capable of application into a number of varied operations. One such industry capable of using vast amounts of this acid is the oil and gas industry. Many operations in this industry are dependent on the use of acids.

The use of acids such as methanesulfonic acid is more prone to lead to a pitting corrosion rather than "uniform corrosion" as seen with, for example, HCl. Pitting corrosion is a localized form of corrosion by which cavities or "holes" are produced in the material. Pitting is considered to be more dangerous than uniform corrosion damage because it is more difficult to detect, predict and design against. Corrosion products often cover the pits. A small, narrow pit with minimal overall metal loss can lead to the failure of an entire engineering system. Pitting corrosion, which, for example, is almost a common denominator of all types of localized corrosion attack, may assume different shapes. Pitting corrosion can produce pits with their mouth open (uncovered) or covered with a semi-permeable membrane of corrosion products. Pits can be either hemispherical or cup-shaped.

There are several reasons why pitting corrosion is difficult to predict or to design against. Some of these reasons include: pitting corrosion can be initiated by a localized chemical or mechanical damage to the protective oxide film. This type of damage may stem from several water chemistry factors such as acidity, low dissolved oxygen concentrations (which tend to render a protective oxide film less stable) and high concentrations of chloride (as in seawater). Pitting corrosion can also be initiated by localized damage to, or poor application of, a protective coating. A third, non-negligible, factor for the initiation of pitting corrosion resides in the presence of non-uniformities in the metal structure of the component, e.g. nonmetallic inclusions.

Theoretically, a local cell that leads to the initiation of a pit can be caused by an abnormal anodic site surrounded by normal surface which acts as a cathode, or by the presence of an abnormal cathodic site surrounded by a normal surface in which a pit will have disappeared due to corrosion.

In the second case, post-examination should reveal the local cathode, since it will remain impervious to the corrosion attack as in the picture of an aluminum specimen shown on the right. Most cases of pitting are believed to be caused by local cathodic sites in an otherwise normal surface.

Apart from the localized loss of thickness, corrosion pits can also be harmful by acting as stress risers. Fatigue and stress corrosion cracking may initiate at the base of corrosion pits. One pit in a large system can be enough to produce the catastrophic failure of that system. An extreme example of this type of catastrophic failure happened in Guadalajara, Mexico, where a single pit in a gasoline line running over a sewer line was enough to create great havoc and kill 215 people.

Figure 1:
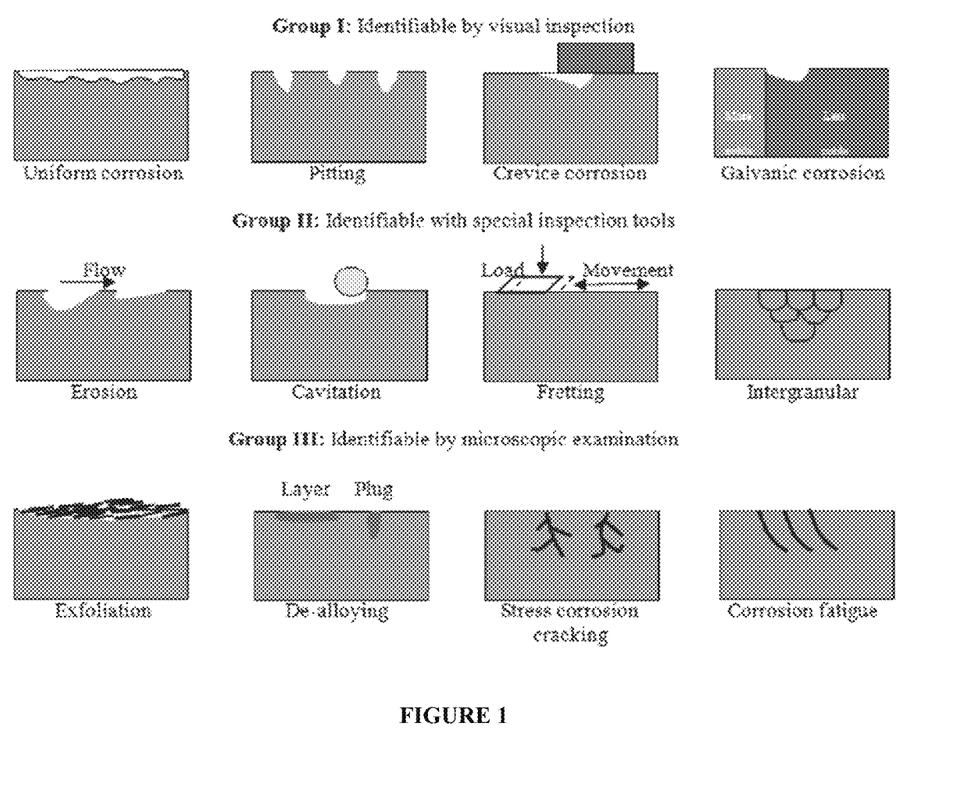
FIG. 1 is a schematic depiction of the various type of damage generated by pitting corrosion.
Figure 2:
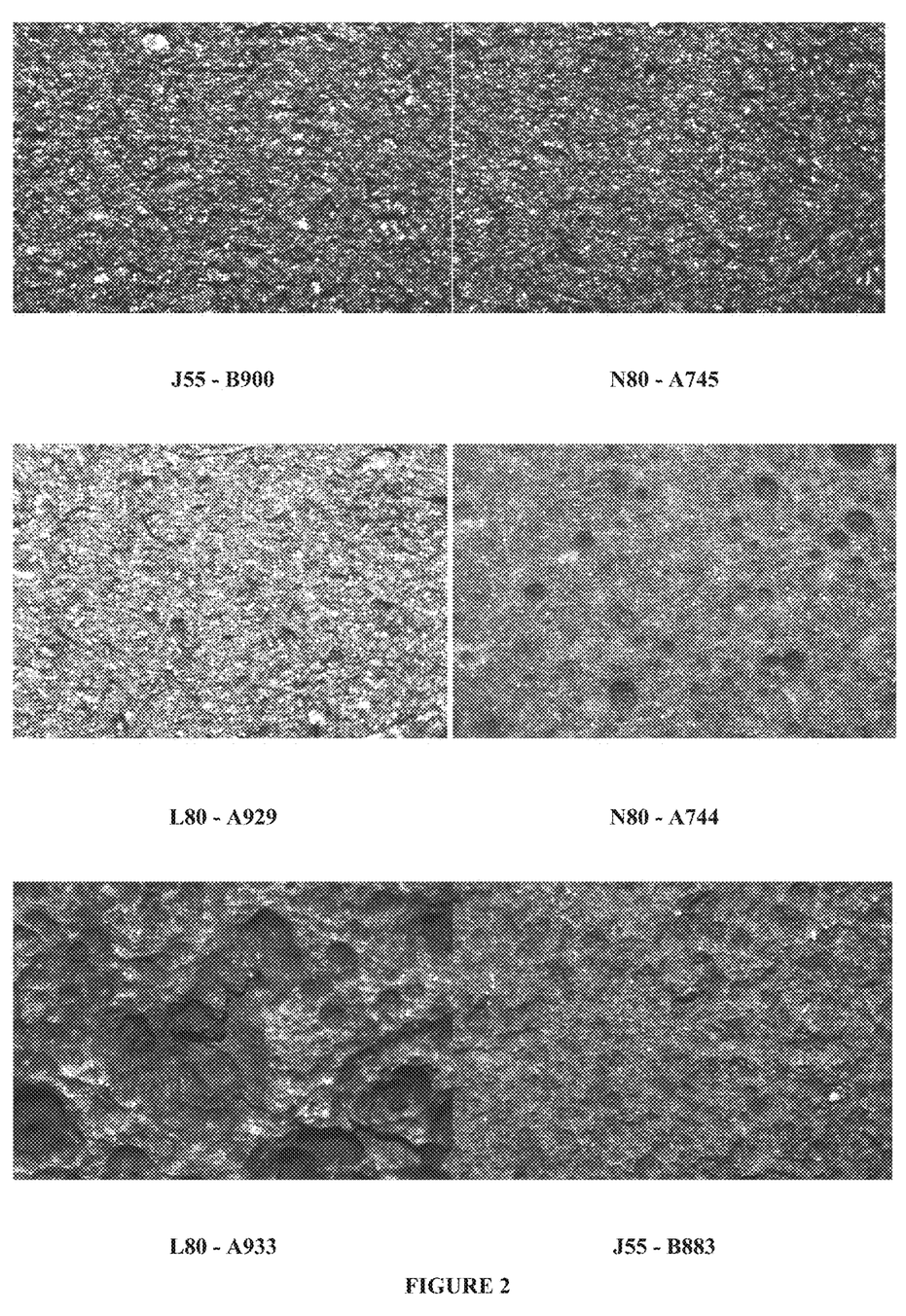
FIG. 2 contains a picture of the surface of 6 metal coupons (identified as B900, A745, A929, A744, A933, and B883) after exposure to acidic fluids as described in the description.
Figure 3:
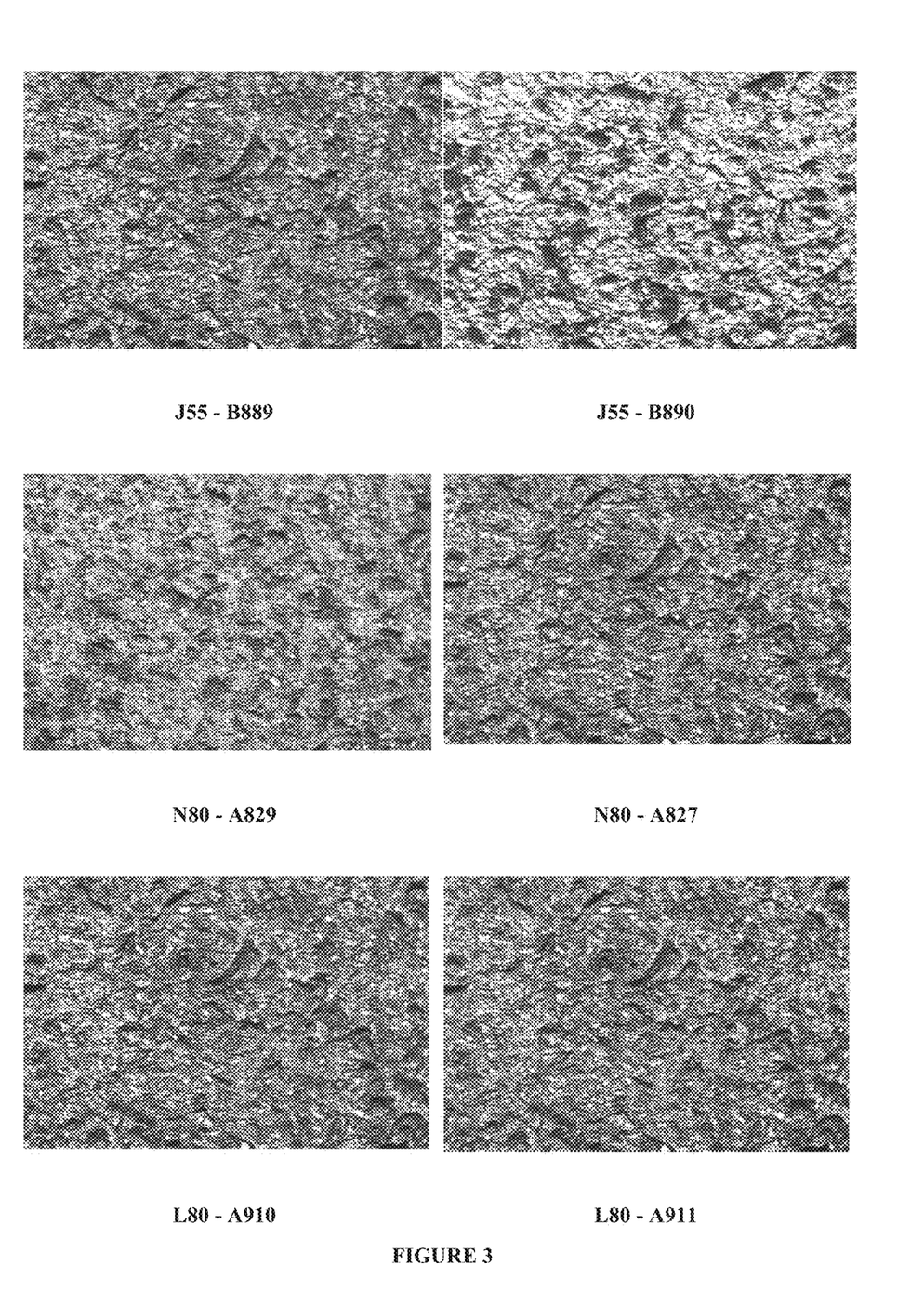
FIG. 3 contains a picture of the surface of 6 metal coupons (identified as B889, B890, A829, A827, A910, and A911) after exposure to acidic fluids as described in the description.
Figure 4:
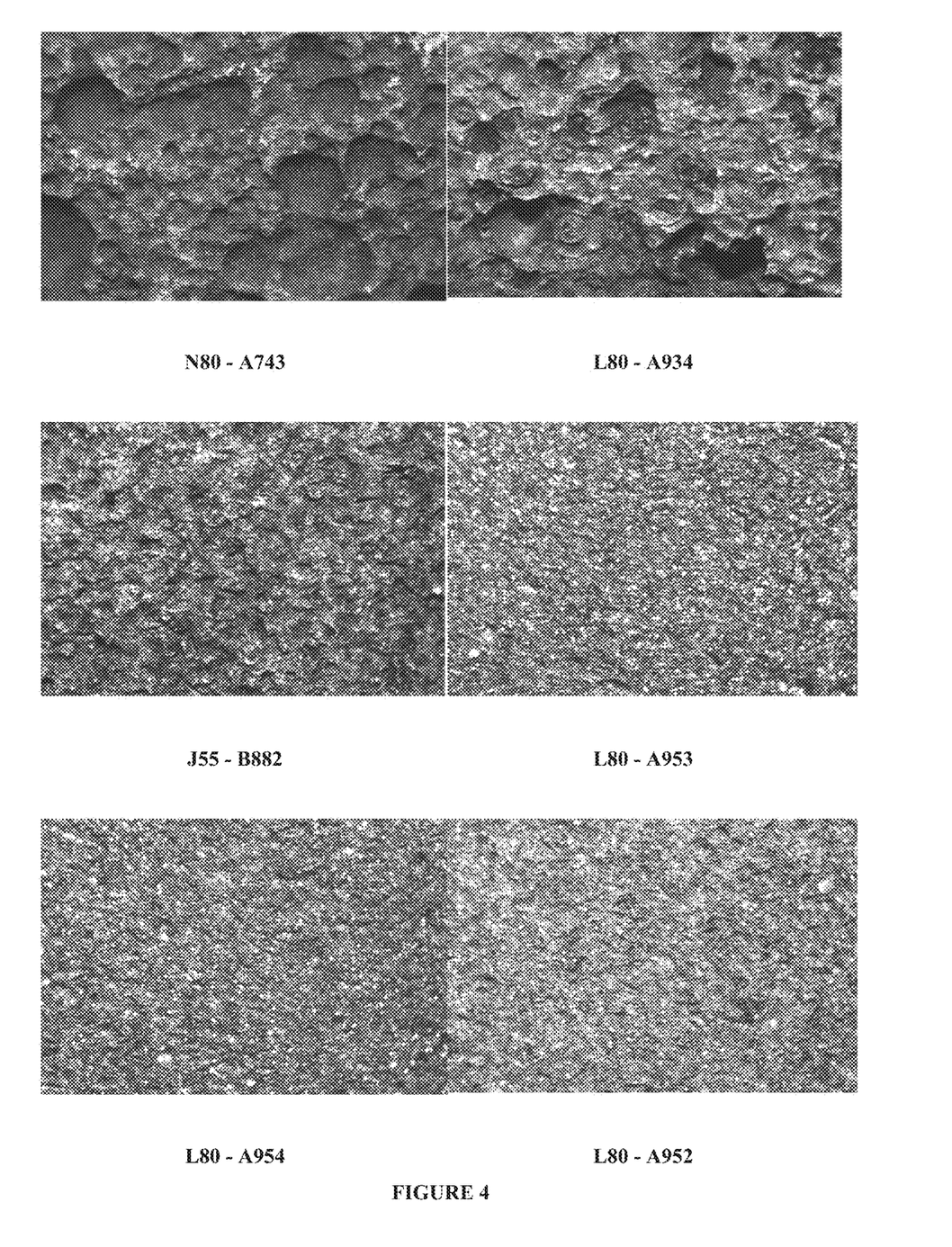
FIG. 4 contains a picture of the surface of 6 metal coupons (identified as A743, A934, B882, A953, A954, and A952) after exposure to acidic fluids as described in the description.
Figure 5:
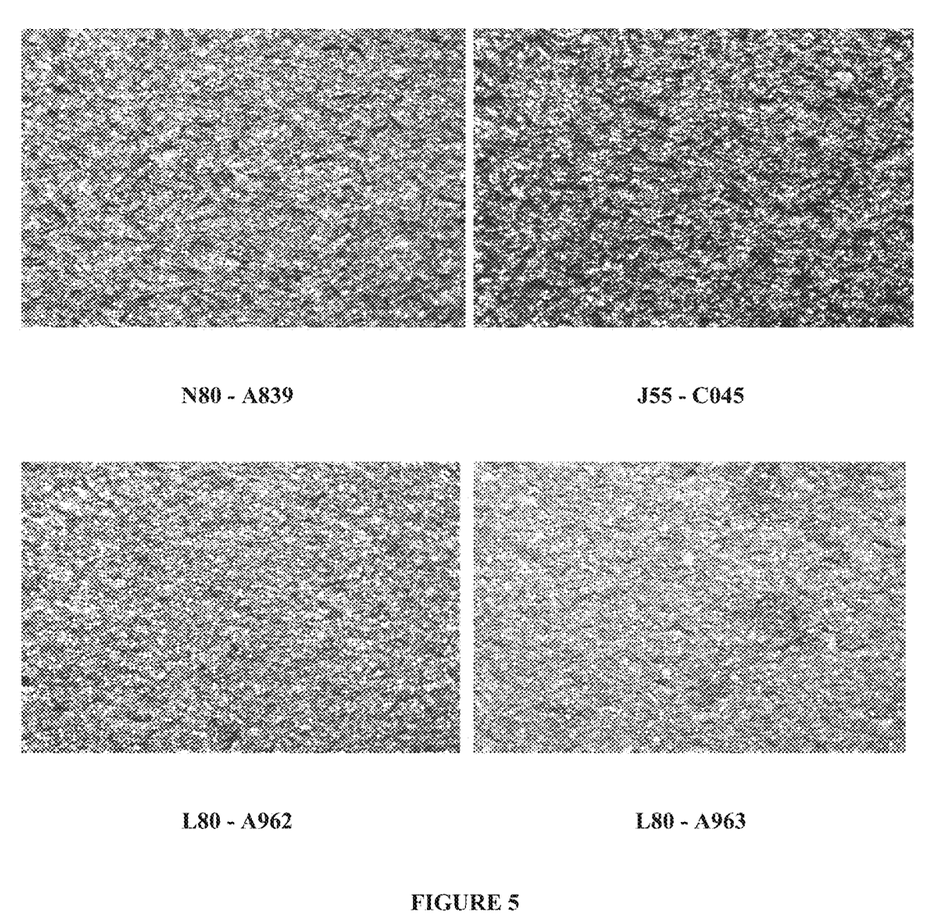
FIG. 5 contains a picture of the surface of 4 metal coupons (identified as A839, C045, A962 and A963) after exposure to acidic fluids as described in the description.

The different corrosion types are set out in FIG. 1. The relevant corrosion types in acid are: uniform corrosion; pitting corrosion; and stress corrosion cracking. The most desired corrosion, when such is bound to occur, is the uniform corrosion. This type of corrosion allows one to easily calculate a mm/year corrosion and the rest thickness of a casing, pipe etc. This is the type of corrosion you see most of the time when metals are exposed to HCl.

As mentioned above, pitting corrosion is a very dangerous form of acid corrosion, as the overall mass loss (lb/ft2 or mm/year) is still low, but due to the focused corrosion at a few spots there is a creation of weak points in the metal. These weak points, caused by the pits, can lead to a catastrophic material failure. Methanesulfonic acid (MSA) at high temperatures (130° C. and higher) is very prone for pitting corrosion, much more than mineral acids such as HCl. Commercially available corrosion inhibitors cannot properly control/limit/minimize pitting done by exposure of steel to MSA. At temperatures of 150° C., those commercial corrosion inbibitors required very high concentrations of intensifier such as KI. These high concentrations of KI required do not allow these corrosion inhibitors to be used in a comprehensive manner. Moreover, higher temperatures than 150° C. cannot be employed.

U.S. Pat. No. 7,216,710 B2 teaches methods of inhibiting corrosion comprising providing a corrosive environment; adding a corrosion inhibitor comprising a reaction product of a thiol compound and an aldehyde compound. Methods of acidizing a near well bore region of a subterranean formation comprising isolating a zone of interest along a well bore; and placing an acidizing solution in the zone of interest wherein the acidizing solution comprises an acid and a corrosion inhibiting compound comprising the reaction product of a thiol compound and an aldehyde compound. The aldehyde compound referred to is cinnamaldehyde or a derivative thereof.

Despite the known prior art, there still exists a need for a better corrosion inhibitor for use with an alkylsulfonic acid such as methanesulfonic acid especially when the operating temperatures are above 130° C. Achievement in providing an improved corrosion inhibitor for this acid could lead to a more widespread use of this acid as it already presents other valuable characteristics.

SUMMARY OF THE INVENTION

It is an object of the present invention to provide a novel alkylsulfonic composition comprising a corrosion inhibitor composition which permits greater stability and less corrosion at high temperatures yielding reduced pitting corrosion.

According to a preferred of the present invention, there is provided an acid composition comprising a corrosion inhibitor package, which upon proper use, results in a very low corrosion rate and very low instance of pitting in oil and gas industry activities equipment on most all types of metals. Preferably, when the temperatures are above 130° C., more preferably, when the temperatures are 150° C. and above.

According to another aspect of the present invention, there is provided a novel composition for use in the oil industry which has a pH below 1. Preferred compositions according to the present invention can be utilized in common day to day operations utilizing acids in the oil & gas industry which operations are selected from the group consisting of: matrix acidizing, fracture acidizing, and spearhead breakdown acidizing.

According to a preferred embodiment of the present invention, the alkylsulfonic acid composition is stable at very high temperatures (up to 180° C. and above) and provides for reduced pitting corrosion.

According to a preferred embodiment of the present invention, there is provided a novel alkylsulfonic acid composition for use in the oil industry which has high salinity tolerance. A tolerance for high salinity fluids, or brines, is desirable for onshore and offshore acid applications. Typical acids are blended with fresh water and additives, typically far offsite, and then transported to the area of treatment as a finished blend. It is advantageous to have an alternative that can be transported as a concentrate safely to the treatment area, then blended with a high salinity produced water or sea water greatly reducing the logistics requirement typical with conventional acid systems. A typical acid system could precipitate salts/minerals heavily if blended with fluids of an excessive salinity level resulting in formation plugging or ancillary damage inhibiting production and substantially increasing costs. Brines are also typically present in formations, thus having an acid system that has a high tolerance for brines can greatly reduce the potential for formation damage or emulsions down-hole during or after product placement/application.

According to a preferred embodiment of the present invention, there is provided an alkylsulfonic acid composition for use in oil industry activities, said composition comprising: methanesulphonic acid; a metal iodide or iodate; and an alcohol or derivative thereof.

According to a preferred embodiment of the present invention, the metal iodide or iodate is cuprous iodide. According to another preferred embodiment, the metal iodide or iodate is potassium iodide. According to another preferred embodiment, the metal iodide or iodate is sodium iodide. According to yet another preferred embodiment, the metal iodide or iodate is lithium iodide. According to a preferred embodiment of the present invention, the metal iodide is present in a concentration ranging from 100 to 5000 ppm. Preferably, the metal iodide is present in a concentration of 1000 ppm.

According to a preferred embodiment of the present invention, the alcohol or derivative thereof is an alkynyl alcohol or derivative thereof. Preferably, the alkynyl alcohol or derivative thereof is propargyl alcohol or a derivative thereof. Preferably, the alkynyl alcohol or derivative thereof is present in a concentration ranging from 0.05 to 1.-5% w/w. More preferably, the alkynyl alcohol or derivative thereof is present in a concentration of 0.7 5% w/w.

According to a preferred embodiment of the present invention, there is provided a use of an alkylsulfonic acid composition in the oil industry to stimulate formations.

According to a preferred embodiment of the present invention, there is provided a use of an alkylsulfonic acid composition in the oil industry to assist in reducing breakdown pressures during downhole pumping operations.

According to a preferred embodiment of the present invention, there is provided a use of an alkylsulfonic acid composition in the oil industry to treat wellbore filter cake post drilling operations.

According to a preferred embodiment of the present invention, there is provided a use of an alkylsulfonic acid composition in the oil industry to assist in freeing stuck pipe.

According to a preferred embodiment of the present invention, there is provided a use of an alkylsulfonic acid composition in the oil industry to fracture wells.

According to a preferred embodiment of the present invention, there is provided a use of an alkylsulfonic acid composition in the oil industry to complete matrix stimulations.

According to a preferred embodiment of the present invention, there is provided a use of an alkylsulfonic acid composition in the oil industry to conduct annular and bullhead squeezes & soaks.

According to a preferred embodiment of the present invention, there is provided a use of an alkylsulfonic acid composition in the oil industry to pickle tubing, pipe and/or coiled tubing.

According to a preferred embodiment of the present invention, there is provided a use of an alkylsulfonic acid composition in the oil industry to increase effective permeability of formations.

According to a preferred embodiment of the present invention, there is provided a use of corrosion inhibitor for use with an alkylsulfonic acid composition in the oil industry to reduce or remove wellbore damage.

According to a preferred embodiment of the present invention, there is provided a use of an alkylsulfonic acid composition in the oil industry to clean perforations.

According to a preferred embodiment of the present invention, there is provided a use of an alkylsulfonic acid composition in the oil industry to solubilize limestone, dolomite, calcite and combinations thereof.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention may be more completely understood in consideration of the following description of various embodiments of the invention in connection with the accompanying figures, in which.

DETAILED DESCRIPTION OF THE PREFERRED EMBODIMENTS

It will be appreciated that numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

The description that follows, and the embodiments described therein, are provided by way of illustration of an example, or examples, of particular embodiments of the principles of the present invention. These examples are provided for the purposes of explanation, and not limitation, of those principles and of the invention.

According to a preferred embodiment of the present invention, there is provided an acidic composition comprising an alkylsulfonic acid and a corrosion inhibition package, said package comprising:

an organic compound comprising at least two aldehyde functional groups a propargyl alcohol or derivative thereof;

at least one amphoteric surfactant; and a solvent.

Preferably, the organic compound comprising at least two aldehyde functional groups is selected from the group consisting of: $C_1$-$C_{16}$ linear hydrocarbon comprising an aldehyde functional group at either extremity of the hydrocarbon. Preferably, the $C_1$-$C_{16}$ linear hydrocarbon comprising an aldehyde functional group at either extremity of the hydrocarbon is a $C_5$-$C_{12}$ linear hydrocarbon. Preferably also, the $C_5$-$C_{12}$ linear hydrocarbon comprising an aldehyde functional group at either extremity of the hydrocarbon is selected from the group consisting of: glutaraldehyde; succinaldehyde; malondialdehyde; adipaldehyde; heptanedial; nonanedial; undecanedial; and dodecanedial.

According to a preferred embodiment, the organic compound comprising at least two aldehyde functional groups is selected from the group consisting of: saturated dialdehyde-containing hydrocarbons and $C_5$-$C_{16}$ branched hydrocarbon dialdehyde.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from $C_8$-$C_{16}$. Most preferably, the amido betaine comprising a hydrophobic tail from $C_8$-$C_{16}$ is cocamidobetaine.

Preferably also, the corrosion inhibition package further comprises an anionic surfactant. Preferably, the anionic surfactant is a carboxylic surfactant or a sulfonic surfactant. More preferably, the carboxylic surfactant is a dicarboxylic surfactant. Even more preferably, the dicarboxylic surfactant comprises a hydrophobic tail ranging from $C_8$-$C_{16}$. Most preferably, the dicarboxylic surfactant is sodium lauriminodipropionate.

Preferably, the surfactant is selected from the group consisting of: cocamidopropyl betaine; β-Alanine, N-(2-carboxyethyl)-N-dodecyl-, sodium salt (1:1); and a combination thereof.

Preferably, the solvent is selected from the group consisting of: methanol; ethanol; isopropanol; ethylene glycol; Di-n-hexyl-ether; and 2-Butoxyethanol; and combinations thereof.

Preferably, the organic compound comprising at least two aldehyde functional groups is present in an amount ranging from 2% to 25% by weight of the total weight of the corrosion inhibition package. Preferably also, the propargyl alcohol or derivative thereof is present in an amount ranging from 10% to 55% by volume of the total weight of the corrosion inhibition package. Preferably also, the at least one surfactant is present in an amount ranging from 2% to 20% by volume of the total weight of the corrosion inhibition package. Preferably also, the solvent is present in an amount ranging from 10% to 45% by volume of the total weight of the corrosion inhibition package.

According to another aspect of the present invention, there is provided an acidic composition comprising:
an acid;
a corrosion package comprising:
the organic compound comprising at least two aldehyde functional groups
a propargyl alcohol or derivative thereof;
at least one surfactant; and
a solvent;
wherein the volume % of the corrosion package in the acidic composition ranges from 0.1 to 10%. Preferably, the acidic composition further comprises a metal iodide or iodate, Preferably the weight/volume % of the metal iodide or iodate in the acidic composition ranges from 0.1 to 1.5%. More preferably, the wt/vol. % of the metal iodide or iodate in the acidic composition ranges from 0.25 to 1.25%. Even more preferably, the wt/vol. % of the metal iodide or iodate in the acidic composition is approximately 1%. Preferably, the metal iodide or iodate selected from the group consisting of: cuprous iodide; potassium iodide; sodium iodide; lithium iodide and combinations thereof. More preferably, the metal iodide is potassium iodide.

The use of a corrosion inhibitor package with an acidic composition where the acidic composition comprises an acid selected from the group consisting of: an alkylsulfonic acid, said corrosion inhibitor package comprising:
the organic compound comprising at least two aldehyde functional groups
a propargyl alcohol or derivative thereof;
at least one amphoteric surfactant; and
a solvent.

According to another aspect of the present invention, there is provided a use of a alkylsulfonic acid composition comprising a preferred embodiment of the present invention in the oil and gas industry to perform an activity selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations, nozzles, ports, jets etc.; solubilizing limestone, dolomite, and calcite; and removing undesirable scale from the group consisting of: equipment, cyclical steam wells, steam flood wells, SAGD (steam assisted gravity drainage) wells, unassisted or natural high formation temperature production wells, injection wells and their related surface and down-hole equipment and facilities at high temperatures of up to 180° C. and above.

Alcohols and derivatives thereof, such as alkyne alcohols and derivatives and more preferably 2-Propyn-1-ol complexed with methyloxirane can be used as corrosion inhibitors. Propargyl alcohol itself is traditionally used as a corrosion inhibitor which works extremely well at low concentrations. It is however a very toxic/flammable chemical to handle as a concentrate, so care must be taken while handling the concentrate. In a composition according to the present invention, 2-Propyn-1-ol complexed with methyloxirane is utilized where the toxic effect does not negatively impact the safety of the composition. There are derivatives of propargyl alcohol available in the industry now that are considered safe to handle, non-regulated, and approved for use in North Sea Offshore Oilfield applications under CEFAS (for UK and NL).

Metal iodides or iodates such as potassium iodide, sodium iodide, cuprous iodide and lithium iodide can potentially be used as corrosion inhibitor intensifier. In fact, potassium iodide is a metal iodide traditionally used as corrosion inhibitor intensifier, however it is expensive, but works extremely well. It is non-regulated, friendly to handle, and listed on the offshore PLONOR (Pose Little Or NO Risk) list as safe chemicals to the environment.

Example 1

Formulation and Process to Prepare an Acidic Composition Comprising a Corrosion Inhibitor Package According to a Preferred Embodiment of the Invention

Start by combining the methanesulphonic acid (42 wt % of the composition) with water (58 wt % of the composition) and mix thoroughly for a few minutes. Add a pre-determined volume of the corrosion inhibitor package according to a preferred embodiment of the present invention described in Table 1 below. Add 0.1 wt % of potassium iodide to the composition. Circulation is maintained until all products have been solubilized. Table 1 lists the components of the acid composition of Example 1, including their weight percentage as compared to the total weight of the composition and the CAS numbers of each component.

TABLE 1

Composition of a corrosion inhibitor used in a composition according to a preferred embodiment of the present invention

| Component | | CI-D1 | CI-D2 |
| --- | --- | --- | --- |
| 2-Propyn-1-ol, compd. with methyloxirane | Vol % | 45 | 45 |
| .beta.-Alanine, N-(2-carboxyethyl)-N-dodecyl-, sodium salt (1:1) | Vol % | 11.6 | 11.6 |
| Cocamidopropyl betaine | Vol % | 11.6 | 11.6 |
| Nonane-1,9-dial (NL) and 2-methyloctane-1,8-dial (MOL) | Vol % | 7 | 0 |
| Glutaric Dialdehyde | Vol % | | 7 |
| Isopropanol | Vol % | 24.8 | 24.8 |
| Total | Vol % | 100 | 100 |

The chemical formula for Nonane-1,9-dial (NL) and 2-methyloctane-1,8-dial (MOL) is as follows:

The chemical formula for Glutaric Dialdehyde is as follows:

The resulting composition of Example 1 is a clear, liquid with a strong odour having shelf-life of greater than 1 year. It has a freezing point temperature of approximately minus 30° C. and a boiling point temperature of approximately 100° C. It has a specific gravity of 1.21±0.02. It is completely soluble in water and its pH is less than 1.

The composition is readily biodegradable, non-fuming and has no volatile organic compounds nor does it have any BTEX levels above the drinking water quality levels. BTEX refers to the chemicals benzene, toluene, ethylbenzene and xylene. Surrogate toxicity testing carried out on rats shows the LD50 to be not less than 1100 mg/kg.

Corrosion Testing

The compositions according to the present invention were exposed to corrosion testing. Various steel grades were exposed to various novel alkylsulfonic acid solutions for periods of time ranging up to 6 hours at temperatures of up to 180° C.

The following corrosion testing outlined in Tables 2 to 9 (below) for acid compositions with known corrosion inhibition packages, for acid compositions with proprietary corrosion inhibition packages and for compositions according to the present invention (diluted at 50% of the stock solution, i.e. example 1) at various temperatures for various durations of exposure. A desirable result was one where the lb/ft$^2$ corrosion number is at or below 0.05. More preferably, that number is at or below 0.02. Also desirable is the control of pitting corrosion as pitting weakens locally a metal, it is desirable to minimize or even completely eliminate pitting. Where coupons are identified, FIGS. 2, 3, 4 and 5 provide a photograph of the surface of the coupon post-corrosion testing. Pitting was noted in some coupons after exposure.

The predominant cause of corrosion of metals by MSA is known to be pitting corrosion, the below testing allows to determine the effectiveness of the corrosion inhibition packages against this very serious type of corrosion. FIG. 1 provides a schematic view of various types of pitting corrosion and methods of identifying each groups of pitting corrosion. In a first case, the pitting corrosion can be identified by simple visual inspection. In a second case, the pitting corrosion can be identified with the use of special inspection tools. And in a third case, the pitting corrosion can be identified by microscopic examination.

TABLE 2

Corrosion testing performed at 150° C. with MSA (21%) for a duration of 6 hours where the steel density is 7.86 g/cc

| Steel type | | Corrosion inhibitor | Loss (g) | Surface area (cm$^2$) | Mils/yr | Mm/ year | Lb/ ft2 |
|---|---|---|---|---|---|---|---|
| J55 | B900 | 2.0% CI-5, 1.5% CI-1A | 0.1046 | 28.992 | 263.8452 | 6.7017 | 0.007 |
| N80 | A745 | 2.0% CI-5, 1.5% CI-1A | 0.1997 | 28.0774 | 520.136 | 13.2115 | 0.015 |
| L80 | A929 | 2.0% CI-5, 1.5% CI-1A | 0.1897 | 28.0774 | 494.0901 | 12.5499 | 0.014 |

CI-1A is a 10% potassium iodide solution. Thus, the total KI present is 0.15%

CI-5 refers to a proprietary corrosion inhibitor package comprising a terpene; a cinnamaldehyde or a derivative thereof; at least one amphoteric surfactant; and a solvent.

TABLE 3

Corrosion testing performed at 150° C. with MSA (21%) where the steel density is 7.86 g/cc

| Steel type | | Corrosion inhibitor | Loss (g) | Surface area (cm$^2$) | Duration of exposure (hr) | Mils/yr | Mm/year | Lb/ft2 |
|---|---|---|---|---|---|---|---|---|
| N80 | A744 | 2.0% CI-2, 1.5% CI-1A | 2.1114 | 28.0774 | 4 | 8248.987 | 209.5243 | 0.154 |
| L80 | A933 | 2.0% CI-2, 1.5% CI-1A | 2.7938 | 28.0774 | 6 | 7276.695 | 184.8280 | 0.204 |
| J55 | B883 | 2.0% CI-2, 1.5% CI-1A | 0.8099 | 28.992 | 6 | 2042.909 | 51.8899 | 0.057 |

CI-1A is a 10% potassium iodide solution.

CI-2 refers to a commercially available corrosion inhibitor package.

TABLE 4

Corrosion testing performed at 180° C. with MSA (21%) where the steel density is 7.86 g/cc

| Steel type | Coupon | Corrosion inhibitor | Loss (g) | Surface area (cm$^2$) | Duration of exposure (hr) | Mils/yr | Mm/year | Lb/ft2 |
|---|---|---|---|---|---|---|---|---|
| J55 | B889 | 3.0% CI-5 2.5% CI-1A 0.2% NE-1 | 0.1291 | 28.992 | 4 | 488.4668 | 12.4071 | 0.009 |
| J55 | B890 | 3.0% CI-5 2.5% CI-1A 0.2% NE-1 | 0.4215 | 28.992 | 6 | 1063.2 | 27.0053 | 0.030 |
| N80 | A829 | 2.25% CI-5 2.0% CI-1A 0.2% NE-1 | 0.2113 | 28.0774 | 4 | 825.5238 | 20.9683 | 0.015 |
| N80 | A827 | 3.0% CI-5 2.5% CI-1A 0.2% NE-1 | 0.4842 | 28.0774 | 6 | 1261.141 | 32.0330 | 0.035 |
| L80 | A910 | 3.0% CI-5 2.5% CI-1A 0.2% NE-1 | 0.1661 | 28.0774 | 4 | 648.9328 | 16.4829 | 0.012 |
| L80 | A911 | 2.25% CI-5 2.0% CI-1A 0.2% NE-1 | 0.2693 | 28.0774 | 4 | 1052.123 | 26.7239 | 0.020 |

CI-1A refers to a 10% solution of potassium iodide;
CI-5 refers to a proprietary corrosion inhibitor package comprising a terpene; a cinnamaldehyde or a derivative thereof; at least one amphoteric surfactant; and a solvent.
NE-1 is a non-emulsifier.

TABLE 5

Corrosion testing performed at 180° C. with MSA (21%) where the steel density is 7.86 g/cc for a duration of exposure of 4 hours

| Steel | Coupon | Corrosion | Loss | Surface | Mils/yr | Mm/year | Lb/ft2 |
|---|---|---|---|---|---|---|---|
| N80 | A743 | 2.25% CI-2, | 3.652 | 28.0774 | 14267.93 | 362.4053 | 0.267 |
| L80 | A934 | 2.25% CI-2 | 1.3818 | 28.0774 | 5398.527 | 137.1226 | 0.101 |
| J55 | B882 | 2.25% CI-2 | 0.3347 | 28.992 | 1266.381 | 32.1661 | 0.024 |

CI-1A is a 10% potassium iodide solution.

TABLE 6

Corrosion testing performed at 150° C. with MSA (21%) where on L80 steel coupons where the steel density is 7.86 g/cc (coupon surface area 28.0774 cm$^2$)

| Corrosion inhibitor | Coupon # | Loss (g) | Duration of Exposure (hours) | Mils/yr | Mm/year | Lb/ft2 |
|---|---|---|---|---|---|---|
| 2.0% CI-DA1, 1.5% CI-1A | A953 | 0.0612 | 4 | 239.1010683 | 6.0732 | 0.004 |
| 2.0% CI-DA1, 1.5% CI-1A | A954 | 0.1155 | 6 | 300.8297755 | 7.6411 | 0.008 |

CI-1A is a 10% potassium iodide solution.

TABLE 7

Corrosion testing performed at 180° C. with MSA (21%) where the steel density is 7.86 g/cc for a duration of exposure of 4 hours

| Steel type | Coupon # | Corrosion inhibitor | Weight loss (g) | Surface area (cm2) | Mils/yr | Mm/year | Lb/ft2 |
|---|---|---|---|---|---|---|---|
| L80 | A952 | 2.25% CI-DA1, 2.0% CI-1A | 0.1379 | 28.0774 | 538.7587798 | 13.6845 | 0.010 |

TABLE 7-continued

Corrosion testing performed at 180° C. with MSA (21%) where the steel density is 7.86 g/cc for a duration of exposure of 4 hours

| Steel type | Coupon # | Corrosion inhibitor | Weight loss (g) | Surface area (cm2) | Mils/yr | Mm/year | Lb/ft2 |
|---|---|---|---|---|---|---|---|
| N80 | A839 | 2.25% CI-DA1, 2.0% CI-1A | 0.1483 | 28.0774 | 579.3903339 | 14.7165 | 0.011 |
| J55 | C045 | 2.25% CI-DA1, 2.0% CI-1A | 0.1493 | 28.992 | 564.8961506 | 14.3484 | 0.011 |

CI-1A is a 10% potassium iodide solution.

TABLE 8

Corrosion testing performed at 150° C. with MSA (21%) where on L80 steel coupons where the steel density is 7.86 g/cc (coupon surface area 28.0774 cm$^2$)

| Coupon # | Corrosion inhibitor | Weight loss (g) | Exposure time | Mils/yr | Mm/year | Lb/ft2 |
|---|---|---|---|---|---|---|
| A962 | 2.0% CI-DA2, 1.5% CI-1A | 0.2033 | 4 | 794.268745 | 20.1744 | 0.015 |
| A963 | 2.0% CI-DA2, 1.5% CI-1A | 0.169 | 6 | 440.1751694 | 11.1804 | 0.012 |

CI-1A is a 10% potassium iodide solution.

TABLE 9

Corrosion testing performed at 180° C. with MSA (21%) where the steel density is 7.86 g/cc for a duration of exposure of 4 hours

| Steel type | Corrosion inhibitor | Loss (g) | Surface area (cm$^2$) | Mils/yr | Mm/year | Lb/ft2 |
|---|---|---|---|---|---|---|
| L80 | 2.25% CI-DA2, 2.0% CI-1A | 0.2058 | 28.0774 | 804.0359455 | 20.4225 | 0.015 |
| N80 | 2.25% CI-DA2, 2.0% CI-1A | 0.152 | 28.0774 | 593.8457906 | 15.0837 | 0.011 |
| J55 | 2.25% CI-DA2, 2.0% CI-1A | 0.1871 | 28.992 | 707.9174131 | 17.9811 | 0.013 |

CI-1A is a 10% potassium iodide solution.

With respect to the corrosion impact of the composition on typical oilfield grade steel, it was established that it was clearly well below the acceptable corrosion limits set by industry for certain applications, such as spearhead applications or downhole scaling. Moreover, it was noted upon visual inspection that the commercially available corrosion inhibitor package did not perform well in the prevention of pitting corrosion (see coupons A744, A933, B883) at temperature of 150° C. and, as expected, was even worse at 180° C. (see coupons A743, A934 and B882) which exhibited very large pits. The proprietary corrosion inhibition package (CI-5) perform well at 150° C. where coupons had few or no pits (see coupons B900, A745 and A929). Where pits were present, these were quite small. At 180° C., pits were more evident (see coupons B889, B890, A829, A827, A910 and A911). Overall, the pits were small but present. For the corrosion inhibition packages according to preferred embodiments of the present invention (CI-DA1 and CI-DA2), there were no visible signs of pitting at 150° C. (see coupons A953, A954, A962 and A963). At 180° C., no pits were seen on coupons A952 and A839 while very minimal and light pitting was observed on coupon C045. Visual analysis of the coupons confirms that the compositions according to a preferred embodiment of the present invention were superior when considering the pitting corrosion predominant in the use of alkylsulfonic acids such as MSA.

Overall, the corrosion rates using a composition according to preferred embodiments of the present invention obtained were up to 3 times less compared to composition using a similar corrosion inhibitor but with an aldehyde containing compound in place of an organic compound comprising at least two aldehyde functional groups. The difference being that CI-DA1 and CI-DA2 comprise a saturated dialdehyde instead of a monoaldehyde. It is hypothesized that the aldehyde reacts with the protonated tertiary amine group in sodium lauriminodipropionate. It appears the organic compound comprising at least two aldehyde functional groups reacts with sodium lauriminodipropionate and forms an aggregate with the ionic groups available from the surfactant and, therefore, is a much more effective film former, which leads to lower corrosion rates.

The uses (or applications) of the compositions according to the present invention are listed in Table 10 (below) and includes (upon dilution thereof ranging from approximately 1 to 75% dilution) but are not limited to: injection/disposal in wells; squeezes and soaks or bullheads; acid fracturing, acid washes or matrix stimulations; fracturing spearheads (breakdowns); pipeline scale treatments; cement breakdowns or perforation cleaning; pH control; and de-scaling applications.

TABLE 10

Applications of the acid compositions according to preferred embodiments of the present invention

| Application | Suggested Dilution | Benefits |
|---|---|---|
| Injection/Disposal Wells | 50% | Compatible with mutual solvents and solvent blends, very cost effective. |
| Squeezes & Soaks Bullhead Annular | 33%-50% | Ease of storage & handling, cost effective compared to conventional acid stimulations. Ability to leave pump equipment in wellbore. |
| Acid Fracs | 50%-66% | Decreased shipping and storage compared to conventional acid, no blend separation issues, comprehensive spend rate encourages deeper formation penetration. |
| Frac Spearheads (Break-downs) | 33%-66% | Able to adjust concentrations on the fly. Decreased shipping and storage on location. |
| Cement Break-downs | 50% | Higher concentrations recommended due to lower temperatures, and reduced solubility of aged cement. |
| pH Control | 0.1%-1.0% | Used in a variety of applications to adjust pH level of water based systems. |
| Liner De-Scaling, Heavy Oil | 1%-5% | Continuous injection/de-scaling of slotted liners, typically at very high temperatures. |

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An alkylsulfonic acid composition comprising an alkylsulfonic acid and a corrosion inhibitor composition, said corrosion inhibitor composition comprising:
   an organic compound comprising at least two aldehyde functional groups;
   optionally, a propargyl alcohol;
   an anionic surfactant which is a dicarboxylic surfactant;
   at least one amphoteric surfactant; and
   a solvent;
wherein the alkylsulfonic acid is present in an amount ranging from 1 wt % to 50 wt % of the sulfonic acid composition in water.

2. The alkylsulfonic acid composition as claimed in claim 1, wherein the alkylsulfonic acid is methanesulfonic acid.

3. The alkylsulfonic acid composition as claimed in claim 1, wherein the at least one amphoteric surfactant is selected from the group consisting of:
   a sultaine surfactant; a betaine surfactant; and combinations thereof.

4. The alkylsulfonic acid composition as claimed in claim 1, wherein at least one amphoteric surfactant is a sultaine surfactant and betaine surfactant and are selected from the group consisting of: an amido betaine surfactant; an amido sultaine surfactant; and combinations thereof.

5. The alkylsulfonic acid composition as claimed in claim 1, wherein the at least one amphoteric surfactant is an amido betaine surfactant and is selected from the group consisting of: an amido betaine comprising a hydrophobic tail from C8 to C16.

6. The alkylsulfonic acid composition as claimed in claim 1, wherein the at least one amphoteric surfactant is cocamidobetaine.

7. The alkylsulfonic acid composition as claimed in claim 1, further comprising an anionic surfactant which is a carboxylic surfactant.

8. The alkylsulfonic acid composition as claimed in claim 1, wherein said anionic surfactant is a dicarboxylic surfactant comprising a hydrophobic tail ranging from C8 to C16.

9. The alkylsulfonic acid composition as claimed in claim 1, wherein said anionic surfactant is an iminodicarboxylate including sodium lauriminodipropionate.

10. The alkylsulfonic acid composition as claimed in claim 1, wherein the surfactant is selected from the group consisting of:
    cocamidopropyl betaine;
    β-Alanine, N-(2-carboxyethyl)-N-dodecyl-, sodium salt (1:1); and
    a combination thereof.

11. The alkylsulfonic acid composition as claimed in claim 1, wherein the propargyl alcohol is present in an amount ranging from 20% to 55% by volume of the total weight of the corrosion inhibitor composition.

12. The alkylsulfonic acid composition as claimed in claim 1, wherein the surfactant is present in an amount ranging from 2% to 20% by volume of the total weight of the corrosion inhibitor composition.

13. The alkylsulfonic acid composition as claimed in claim 1, wherein the solvent is present in an amount ranging from 10% to 45% by volume of the total weight of the corrosion inhibitor composition.

* * * * *